United States Patent [19]

Fujita et al.

[11] 4,342,040

[45] Jul. 27, 1982

[54] HEAT SENSITIVE RECORDING SYSTEM

[75] Inventors: Yoshio Fujita, Yokohama; Kiyoshi Hosoya, Fujisawa, both of Japan

[73] Assignee: Hitachi, Ltd., Tokyo, Japan

[21] Appl. No.: 180,584

[22] Filed: Aug. 25, 1980

[30] Foreign Application Priority Data

Aug. 24, 1979 [JP] Japan .................................. 54-107257

[51] Int. Cl.³ ........................ G01D 15/10; H05B 3/20
[52] U.S. Cl. .................................. 346/76 R; 219/216
[58] Field of Search .............. 346/76 R, 76 PH, 76 L; 219/216

[56]  References Cited

U.S. PATENT DOCUMENTS 3,826,892  7/1974  Draugelis et al. ................... 219/216
4,056,822  11/1977  Thornburg et al. .............. 346/76 R Primary Examiner—Donald A. Griffin
Attorney, Agent, or Firm—Craig and Antonelli

[57]  ABSTRACT

A heat sensitive recording system including a head base for mounting thereon a heat sensitive recording head formed at opposite end portions thereof with guide notches for having a shaft of a pressing roller engaged therein, to automatically bring the generatrix of the pressing roller into alignment with a heat generating resistance layer extending in a straight manner on the heat sensitive recording head when the head and the roller are brought into contact with each other.

6 Claims, 6 Drawing Figures a # HEAT SENSITIVE RECORDING SYSTEM

BACKGROUND OF THE INVENTION

1. FIELD OF THE INVENTION

This invention relates to heat sensitive recording systems for use in facsimile systems and the like, and more particularly it is concerned with a mechanism for positioning a heat sensitive head and a pressing roller relative to each other.

2. DESCRIPTION OF THE PRIOR ART

Facsimile transmission which combines the spontaniety of telephone with the recordability of post has come in recent years to play an increasingly important role in automating business transactions. Facsimile systems now in practical use are broadly divided into two types by the recording system: one type uses an electrostatic recording system and the other type uses a heat sensitive recording system. The heat sensitive recording system offers many advantages over the electrostatic recording system. First of all, the former is free from any danger because no smoke and no odor are produced. The heat sensitive recording sheets are less expensive than the electrostatic recording sheets of the prior art used in facsimile transmission. The heat sensitive recording system requires no developing ink or toner for developing and fixing the images and is superior to the electrostatic recording system in maintenance and reliability in performance. Moreover, the former is more economical than the latter because no expendables to recording sheets are required.

A heat sensitive recording system for use in a facsimile system, for example, comprises a heat sensitive head including a narrow heat generating resistance layer extending in a straight manner on a base plate formed of a heat resistant material of high resistance, and a pressing roller, wherein a heat sensitive recording sheet is held between the heat sensitive head and the pressing roller brought into pressing contact with the heat sensitive head by suitable means, to carry out recording.

In this recording system, it is essential, for obtaining well-defined images of uniform darkness, that the generatrix of the pressing roller be correctly positioned with respect to the resistance layer extending in a straight manner, although it is no less essential that the pressing roller applies pressure to the heat sensitive head with a force uniformly distributed lengthwise of the roller. Thus positioning of the heat sensitive head and the pressing roller relative to each other is a problem that should be solved satisfactorily. On the other hand, facilitation of insertion of a recording sheet between the heat sensitive head and the pressing roller, cleaning of the heat generating resistance layer of the heat sensitive recording head and elimination of possible jamming of the recording sheets makes it necessary to bring the lengthwise surface of the head and the lengthwise surface of the roller out of engagement with each other. Thus the head and roller are supported by separate support means for movement toward and away from each other. As a result, in the prior art, the aforesaid positioning of the heat sensitive recording head and the pressing roller relative to each other cannot be accomplished merely by giving precise finishes to the parts thereof, and it is necessary to adjust the positional relation of the head to the roller at the time of assembling.

SUMMARY OF THE INVENTION

This invention has as its object the provision of a heat sensitive recording system of simple construction which eliminates the need to effect adjustments of the position of the heat sensitive recording head because the head and the pressing roller are automatically brought into alignment with each other in correct positional relation.

The outstanding characteristic of the invention is that the heat sensitive recording head is resiliently supported and has guide notches formed therein to enable the shaft of the pressing roller to be fitted therein when the heat sensitive recording head is located in a predetermined operative position. Thus the head can be automatically brought into alignment with the roller and correctly positioned relative thereto.

DESCRIPTION OF THE PREFERRED EMBODIMENTS

Figure 1:
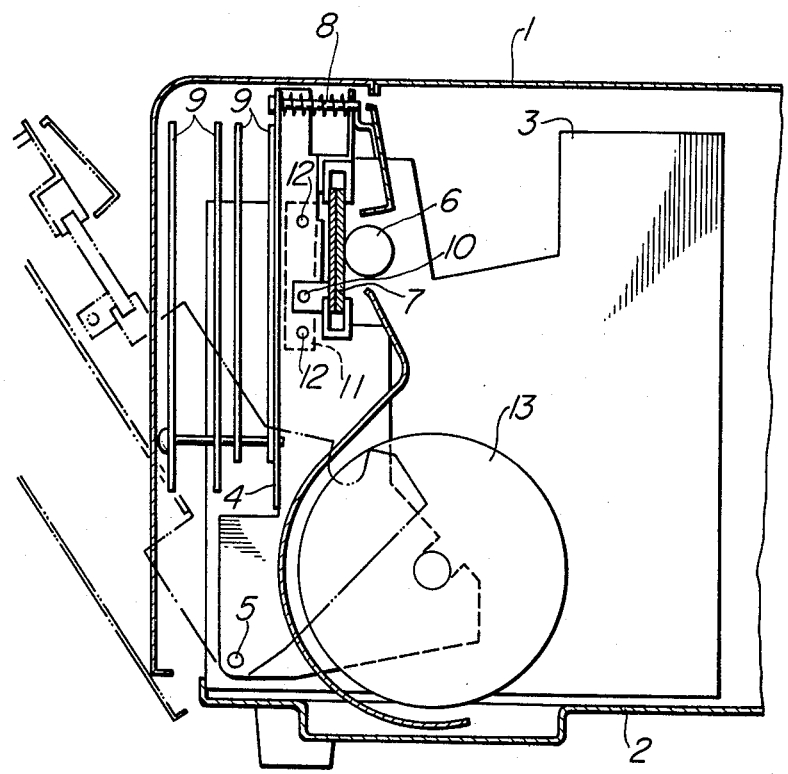
FIG. 1 is a sectional view of a heat sensitive recording system of the prior art.

Before describing the embodiments of the invention in detail, a heat sensitive recording system of the prior art referred to in the background of the invention will be outlined, to enable the features and advantages of the invention to be better understood. Referring to FIG. 1, a pressing roller 6 is supported by a main body 3 of the recording system disposed within a housing 1 and secured to a base 2. A recording head 7 is resiliently supported by a frame 4 through springs 8. The frame 4 including the recording head 7 can be pivotally moved to and from a dash-and-dot line position about a pivot 5 with respect to the main body 3. Thus the recording head 7 can be moved toward and away from the pressing roller 6. To effect positioning of the recording head 7 with respect to the pressing roller 6, the recording head 7 is resiliently supported at pivots 10 to enable the position of the recording head 7 to be adjusted relative to the frame 4. More specifically, support members 11 having the support pins 10 secured thereto are adjusted, and the support members 11 are secured to the main body 3 by screws 12 when positioning of the recording head 7 is accomplished.

This positioning process has disadvantages that the position adjusting is a time-consuming operation and increases cost. There is no reference for effecting positioning, and adjustments should be effected in three dimensions. The operator has no way to adjust the position of the recording head other than by relying on his visual faculty or by recording images on trial to determine whether the head is correctly positioned relative to the pressing roller. In FIG. 1, the numeral 9 designates diode base plates and numeral 30 a supply roll of heat sensitive paper.

Embodiments of the invention will now be described by referring to FIGS. 2-6.

Figure 2:
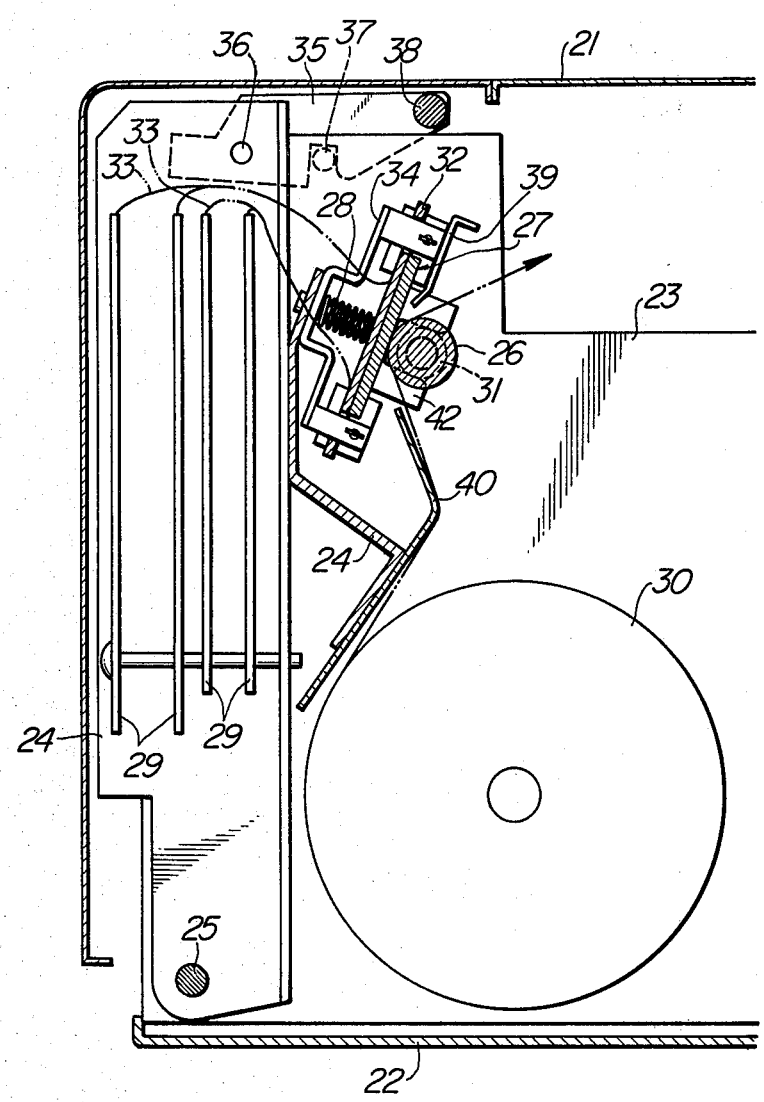
FIG. 2 is a sectional view of the heat sensitive recording system comprising one embodiment of the invention.
Figure 3:
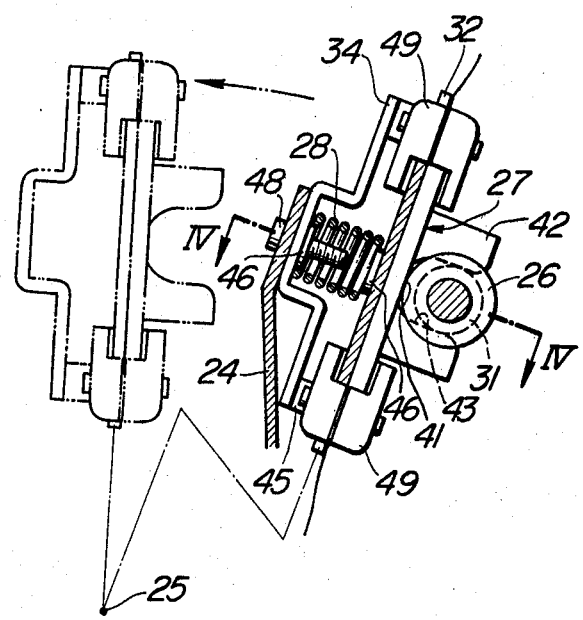
FIG. 3 is a sectional view, on an enlarged scale, taken along the line III—III of FIG. 4, showing the positioning mechanism of the recording system shown in FIG. 2.
Figure 4:
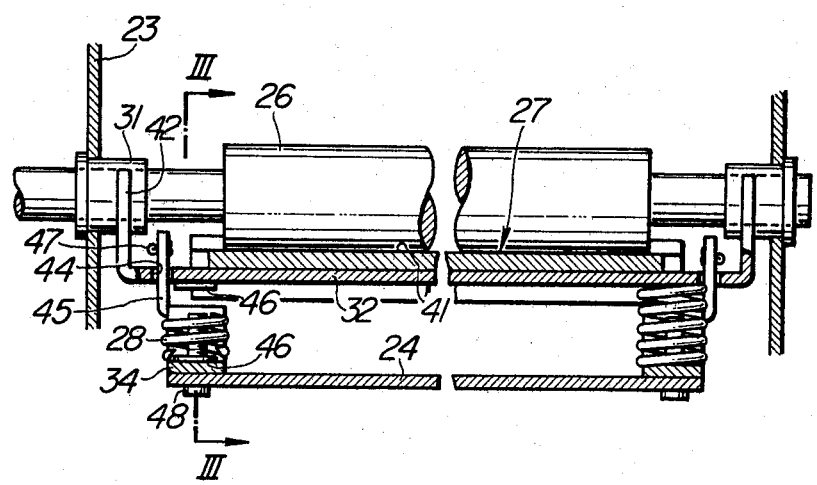
FIG. 4 is a sectional view taken along the line IV—IV in FIG. 3.

FIGS. 2-4 show one embodiment of the heat sensitive recording system in conformity with the invention comprising a housing 21, a base 22 and side plates 23 constituting the main body of the system. The side plates 23 support therebetween a pressing roller 26 through bearings 31, as well as a drive motor, not shown, for driving the pressing roller 26 and guides 39 and 40 for a roll of a heat sensitive recording paper 30. A frame 24 resiliently supports a heat sensitive recording head 27 of ceramic material through springs 28 and diode matrix base plates 29 or a head drive circuit connected to the head 27 through flexible bases 33, and is in turn supported at a pivot 25 by the main body of the recording system for pivotal movement relative thereto. The head 27 may be one disclosed in U.S. Pat. No. 3,984,844 to Tanno et al. Lock levers 35 are provided for positioning the frame 24 in a predetermined position where the heat sensitive recording head 27 is brought into pressing engagement with the pressing roller 26. Each lock lever 35 is supported at a pivot 36 by the frame 24 and formed with a cutout serving as a cam so that the frame 24 is correctly positioned with respect to the main body of the recording system when the cutout engages with a pin 37 attached to the side plate 23. A rod 38 interconnecting the left and right lock levers 35 serves as a handle for releasing the lock levers 35. By lifting the rod 38, the operator can release the lock levers 35 from engagement with the pins 37, to allow the frame 24 to move in pivotal movement about the pivot 25.

The heat sensitive recording head 27 has, on its surface juxtaposed against the pressing roller 26, a heat generating resistance layer 41 straightly extending from end to end of the head 27 longitudinally thereof. The resistance layer may have its width, for example, about 0.5 mm. The head 27 is clamped by clamps 49 to a head base or head support 32 serving the purposes of dissipating heat and reinforcing the head 27.

The head base or support 32 has a bent standing end 42 formed at either longitudinal end thereof. The standing ends 42 are each formed therein with a U-shaped guide notch 43 of a dimension allowing one of the bearings 31 to be fitted therein with tolerance. The guide notches 43 are disposed in the center of the width of the head base 32, and the heat generating resistance layer 41 is located in the center of the width of the head 27. The head 27 and the longitudinal portion of the head base 32 in engagement with the head 27 have the same width and are secured to each other in such a manner that the widthwise edges thereof coincide. This brings the center of the guide notches 43 into agreement with the center of the heat generating resistance layer 41. Positioning of the guide notches 43 with respect to the heat generating resistance layer 41 may be effected by using either of the widthwise edges of the notches 43 as a reference. Guide plates 34 are each secured by a screw 48 to the frame 24, and the head base 32 is formed with square openings 44 each permitting one of guide pieces 45 bent from and formed integrally with the guide plates 34 to extend therethrough. The square openings 44 have a size such that the head base 32 has certain latitude of movement relative to the guide pieces 45.

As shown in FIG. 4, the compression coil springs 28 interposed between the head base or support 32 and the guide plates 34 are located symmetrically in positions immediately beneath the pressing roller 26 which positions are regulated by circular push-out portions 46 formed on both the guide plates 34 and the head base 32. Cotter pins 47 prevent dislodging of the head base 32 from the guide plates 34. By the aforesaid arrangement, the heat sensitive recording head 2 is resiliently supported by the frame 24 and has certain latitude of movement in three dimensions. The arrangement that the heat sensitive recording head 27 is in an inclined position when in an operative position accommodates the movement of the head 27 along a path which is determined by the positional relation of the head 27 to the pivot 25, to ensure that the bearings 31 are smoothly received in the guide notches 43.

Operation of the recording system of the aforesaid construction will now be described. When the heat sensitive paper 30 is fed between the heat sensitive head 27 and pressing roller 26, when the head 27 is cleaned or when recording paper jamming is eliminated, the rod 38 is lifted to release the lock levers 35 from engagement with the pins 37, to allow the frame 24 to move about the pin 25 in pivotal movement counterclockwise in FIG. 2. This moves the head 27 of the heat sensitive recording system and parts associated therewith to a dash-and-dot line position in FIG. 3 in which the head 27 is released from engagement with the pressing roller 26 so that the desired operation may be performed. After the desired operation is performed, the aforesaid process is reversed to return the frame 24 to its original position or solid line position in FIG. 3. That is, when the recording paper is fed between the head 27 and roller 26, the roll of recording paper 30 is attached to the main body of the system and the leading end portion of the recording paper 30 is payed out of the roll and placed on the pressing roller 26, before the frame 24 is returned to its original position. This brings the recording paper 30 into engagement with the heat sensitive recording head 27 as the same is urged against the pressing roller 26 by the biasing forces of the springs 28 when the lock levers 35 engage the pins 37, so that the recording paper 30 is pressed by a suitable force against the head 27 to perform a recording operation. At this time, even if the path of movement of the heat generating resistance layer 41 on the head 27 is displaced with respect to the shaft of the roller 26, the heat generating resistance layer 41 is automatically brought into alignment with the roller 26 in such a manner that the resistance layer follows the shaft of the roller 26, because the head 27 is resiliently supported with certain latitude and the bearings 31 are received in the guide notches 43. This eliminates the need to effect correction of the position of the head 27 with respect to the roller 26 following feeding of the recording paper 30 between them.

Figure 5:
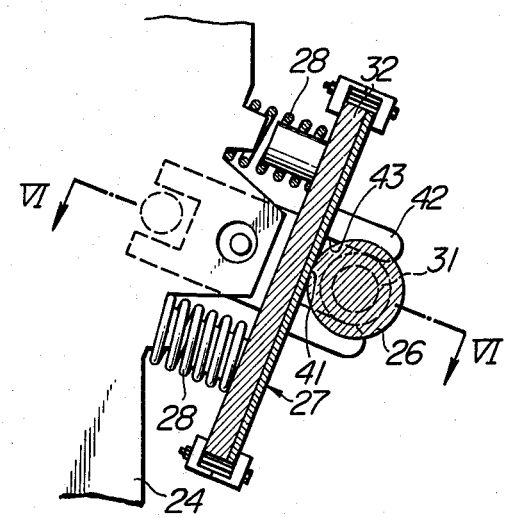
FIG. 5 is a sectional view, on an enlarged scale, of a modification of the positioning mechanism shown in FIG. 3.
Figure 6:
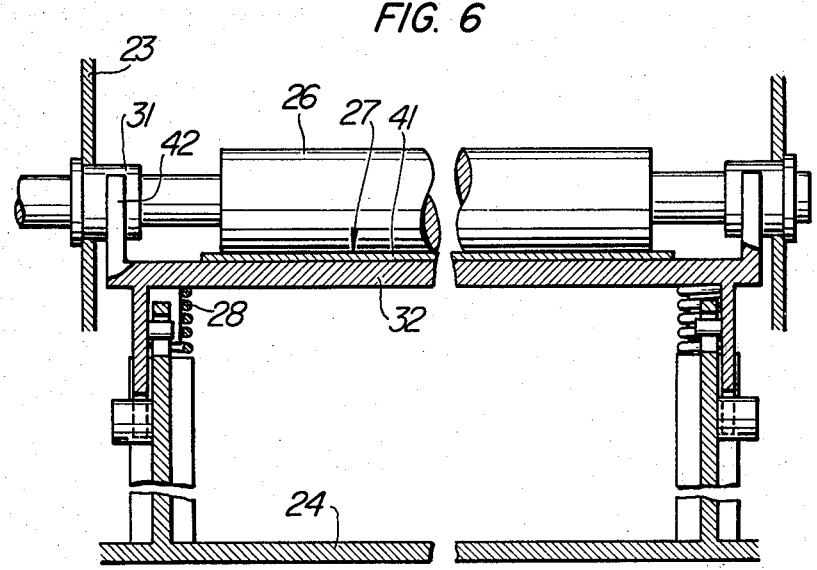
FIG. 6 is a sectional view taken along the line VI—VI in FIG. 5.

FIGS. 5 and 6 show another embodiment of the invention in which parts similar to those shown in FIGS. 2-4 and having the same function are designated by like reference characters.

In FIGS. 5 and 6, the compression springs 28 which are four in number are mounted between the head base or support 32 and the frame 24 for bringing the heat sensitive recording head 27 into pressing engagement with the pressing roller 26 through the head base 32 in such a manner that two springs 28 are disposed at either longitudinal end of the head base 32 and near either widthwise edge thereof.

From the foregoing description, it will be appreciated that the heat sensitive recording head according to the invention can be positioned with certain tolerance. This eliminates the need to give precise finishes to the parts, such as the guide plates, frame, etc., supporting the head and the need to effect correcting of position when the recording system is assembled. The recording system according to the invention is simple in construction and yet does not require positioning of the head. Moreover, assembling of the parts is facilitated, thereby reducing cost.

What is claimed is:

1. A heat sensitive recording system comprising:
   a pair of side plates constituting a main body of the recording system;
   a pressing roller journalled by said side plates;
   a frame pivotally movable toward and away from said pressing roller around a pivot with respect to said main body of the recording system;
   a pair of guide plates each secured to said frame at either of widthwise edges thereof, said guide plates each having a guide piece;
   a head base having its opposite end portions bent in one direction to provide standing portions at the ends formed with guide notches therein for engaging said roller, said head base being formed in the vicinity of said bent standing portions with square openings for allowing said guide pieces of said guide plates to extend therethrough;
   a heat sensitive recording head mounted on the surface of said head base facing said roller; and
   coil springs mounted between said guide plates and said head base for bringing said heat sensitive recording head mounted on said head base, into pressing engagement with said pressing roller.

2. A heat sensitive recording system as claimed in claim 1, wherein said pressing roller is supported by said side plates through bearings, and said bearings are engaged in said guide notches.

3. A heat sensitive recording system as claimed in claim 1, wherein said coil springs for bringing said heat sensitive recording head mounted on said head base, into pressing engagement with said pressing roller are four in number with two coil springs being disposed on either of opposite ends of said head base and each disposed near either of widthwise edges thereof.

4. A heat sensitive recording system comprising: a stationary housing, a shaft mounted on said housing, a roller mounted on said shaft, a heat sensitive recording head having thereon a linear heat generating element, and a head support having said recording head mounted thereon and being formed with guide grooves, said head support being mounted for movement between a first position in which said shaft is fitted into said guide grooves and said recording head is in engagement with said roller so that the generatrix of said roller is aligned with said linear heat generating element, and a second position in which said guide grooves and said recording head are disengaged from said shaft and said roller, respectively.

5. A heat sensitive recording system as defined in claim 4, wherein said housing includes a pair of side plates, and wherein said recording system further includes a pair of bearings mounted on said side plates, respectively, for rotatably supporting said shaft, said bearings being fitted in said guide grooves when said head support is in said first position.

6. A heat sensitive recording system as defined in claim 4, further including: a frame having mounted thereon said head support and mounted on said housing so as to be movable relative thereto, and coil springs resiliently supporting said head support on said frame, said recording head being resiliently urged against said roller when said head support is in said first position.

* * * * *